Dec. 17, 1963     D. G. SPRIGINGS     3,114,441
CURRENT COLLECTOR MECHANISM
Filed May 23, 1961     2 Sheets-Sheet 1
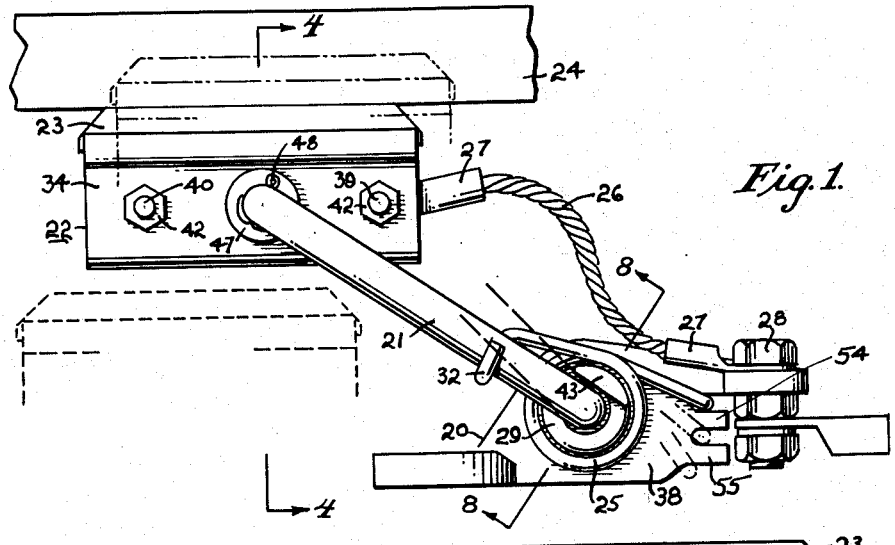
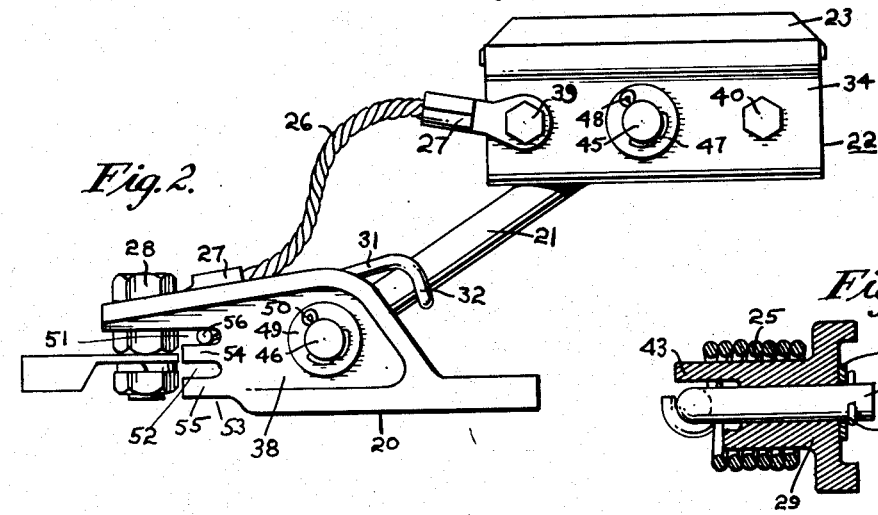
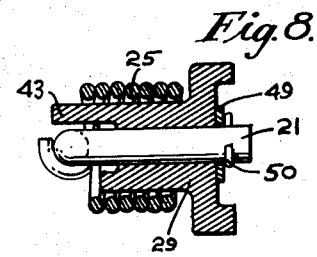
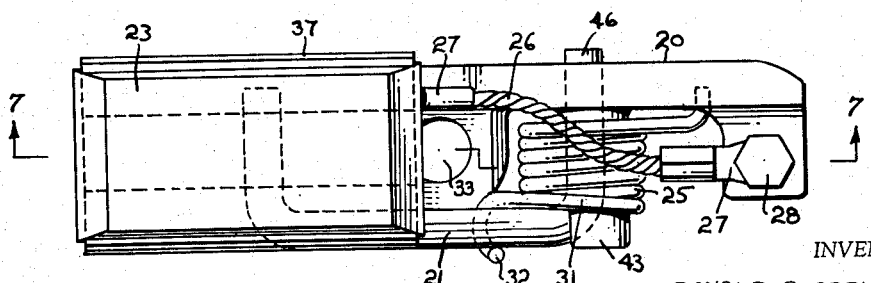
INVENTOR.
DONALD G. SPRIGINGS
BY
ATTORNEY.

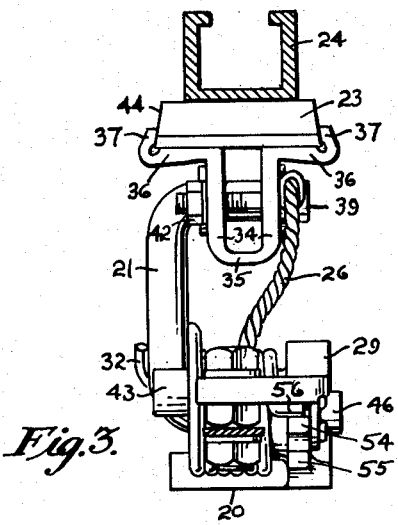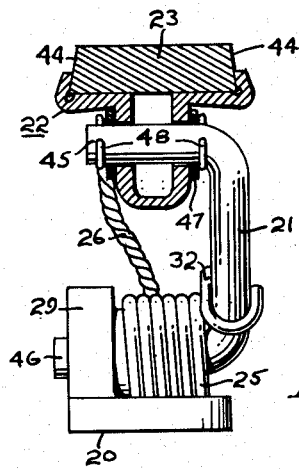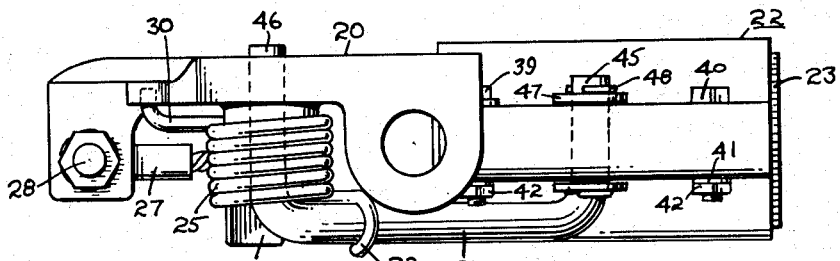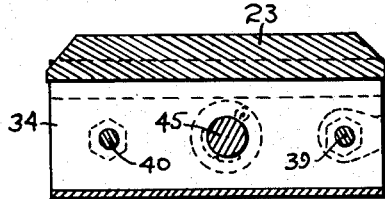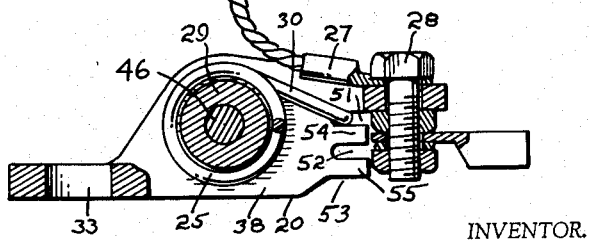

United States Patent Office 3,114,441
Patented Dec. 17, 1963

3,114,441
CURRENT COLLECTOR MECHANISM
Donald G. Sprigings, Lynchburg, Va., assignor to H. K. Porter Company, Inc., Lynchburg, Va., a corporation of Delaware
Filed May 23, 1961, Ser. No. 112,025
5 Claims. (Cl. 191—69)

This invention relates generally to current collector arms mountable on movable utilities for the purpose of transferring electric current from a conductor rail system to the utility for operation thereof. More particularly, this invention relates to a particular type of current collector arm which may be designated as a torsion arm collector. The current collector device includes an arm extending upward from a pivotal connection at a mounting base to a point of upper termination upon which is pivotally mounted a current collector shoe, the arm and shoe mounted thereupon being biased away from the mounting base by a torsion spring system mounted upon the base and linked to the arm. The torsion spring biasing arrangement materially simplifies the structure of the mounting base and the arm and confers the ability to utilize relatively short contact shoe supporting arms resulting in an extremely compact physical size for the entire collector device structure. Accordingly, it is a primary object of this invention to provide a current collector device which includes a current collector shoe pivotally mounted to a torsion spring biased pivoted supporting arm.

Another object of this invention is to provide a novel current collector device of small physical size and simple structural configuration by advantageously employing the characteristics of a spring when placed in torsion.

Still another object of this invention is to provide a novel current collector device as aforesaid wherein the contact collector shoe includes means for quickly and easily releasing therefrom the conductor rail system engaging contact block, thereby effecting a simple and rapid replacement of such contact blocks when sufficiently worn.

The foregoing and other objects of this invention will become apparent from a reading of the following specification in conjunction with an examination of the appended drawings, wherein:

FIGURE 1 is a side elevational view of the current collector device according to the invention, illustrated with the contact block thereof in physical engagement with one rail of a conductor rail system and with alternate elevated positions of the contact shoe being illustrated by displaced upper and lower phantom line showings;

FIGURE 2 is an elevational view of the current collector device according to the invention when viewed from the side opposite to that shown in FIGURE 1;

FIGURE 3 is an end elevation of the current collector device as would be seen when viewed from the right of FIGURE 1;

FIGURE 4 is a vertical sectional view through the current collector shoe as would be viewed along the line 4—4 of FIGURE 1, also showing in elevation certain details of the torsion spring anchor structure;

FIGURE 5 is a plan view of the current collector device of FIGURES 1 and 2;

FIGURE 6 is a bottom plan view looking upward at the current collector device of FIGURES 1 and 2;

FIGURE 7 is a vertical sectional view through the current collector device as would be seen when viewed along the line 7—7 of FIGURE 5; and FIGURE 8 is a fragmented detail view of the torsion spring loaded pivotal connection of the shoe supporting arm of the current collector device as would be seen when viewed along the line 8—8 of FIGURE 1.

In these several figures, like elements are denoted by like reference characters.

Turning now to the figures, and particularly to FIGURES 1, 2 and 7 first, it is observed that the current collector device according to the invention includes a cast, generally elongated base member 20, an arm 21 pivotally secured to the base 20 and extending upward to a point of pivotal connection with the collector shoe 22, and a contact block 23 carried by the collector shoe 22 biased vertically upward into engagement with the underside of a C-bar conductor rail 24 by means of the coil torsion spring 25 wrapped about the base hub formation 29 and secured at opposite ends to the base 20 and arm 21. The collector shoe 22 is positively electrically connected to the base member 20 by means of the flexible braided conductor 26, terminal lugs 27 and securing bolts 28 and 39. The base member 20 may be conveniently secured to its associated utility by means of a bolt (not shown) which may be projected downward through the hole 33 in the base member 20.

As may be most clearly seen in FIGURES 3 and 4, the collector shoe 22 comprises a central U-shaped channel section having side walls 34 and a bridging bottom wall 35, the channel side walls 34 having lateral flanges 36 extending horizontally outward from the tops thereof which terminate with upwardly inturned contact block clamping edges 37. As best seen in FIGURES 1, 2 and 7, the collector shoe central channel section side walls 34 are transversely drilled proximate opposite ends to provide a set of aligned holes through which are disposed respectively at opposite ends a bolt 39 and a bolt 40, each of which is secured by means of a lock washer 41 and a nut 42. These bolting assemblies perform two functions, one function being that of clamping the contact block 23 within the confines of the block clamping edges 37 of the collector shoe 22, and the other being that of securing the flexible cable 26 to the collector shoe 22. The securement of the flexible conductor 26 to the collector shoe is accomplished by projecting the shank of the bolt 39 through the eye of the terminal lug 27 just before passing the bolt transversely through the aligned apertures at one end of the collector shoe 22, good electrical contact between the collector shoe and flexible conductor being effected upon tightening of the nut 42 upon the bolt 39.

The contact block clamping action is accomplished by virtue of the fact that the side walls 34 of the collector shoe 22, when unclamped, tend somewhat to resiliently move away from one another and, of course, cause the collector shoe block clamping edges 37 to similarly move laterally apart. In this relaxed state of the collector shoe, the contact block 23 may be readily slid endwise into seating engagement on the top of the flanges 36 of the collector shoe 22, and when thereafter the bolts 39 and 40 are drawn up, the collector shoe block clamping edges 37 will move inward toward one another and securely clamp the side surfaces 44 of the contact block 23. As best seen in FIGURES 3 and 4, the side surfaces 44 of the contact block 23 taper inward toward one another from the bottom to the top of the contact block 23 so that when clamped they are overlapped by the collector shoe clamping edges 37. From the foregoing, it will be realized that replacement of the contact block 23 is a very simple matter, involving merely the loosening of the bolts 39 and 40 to free the contact block from the clamping edges 37 of the collector shoe, whereupon the old block may be removed and a new one slipped quickly into place and thereafter secured by retightening of the bolts 39 and 40.

The collector shoe supporting arm 21 is generally of

C-shape having an upper laterally turned leg 45 and a lower laterally turned leg 46. The upper leg 45 is projected laterally through a pair of aligned holes located longitudinally centrally in the collector shoe central channel section side walls and is secured in place by means of a pair of outside flat washers 47 and cotter pins 48, the cotter pins being projected through holes drilled transversely through the upper leg 45. Similarly, the lower laterally turned leg 46 is projected through a horizontal bore in the central hub 29 of the base member 20 and is secured therein at its outer end by means of a flat washer 49 and cotter pin 50.

The mounting base 20 is observed to include a major vertical wall 38 from which laterally projects the integrally formed hub formation 29. This vertical base wall 38 is formed with a pair of fingers 54 and 55 projecting in longitudinal continuation thereof and off to one side of the hub 29. The horizontally extending fingers 54 and 55 are spaced vertically apart to form the three vertically positioned recesses 51, 52 and 53. Disposed about the laterally projecting hub 29 of the base 20 are the coils of the helical torsion spring 25, the spring end coils being turned outward to form the base engaging end 30 and arm engaging end 31. The spring base end 30 is terminated by a laterally turned tail 56 observed to be disposed within the upper recess 51 of the base vertical wall 38, while the spring arm end 31 is terminated by an upturned hook 32 disposed about the collector shoe supporting arm 21 at a point somewhat removed from the pivotal axis of the supporting arm lower leg 46. With the spring 25 in a preset torsioned state, and with the tail 56 and hook 32 latched respectively to the base 20 and arm 21, it will be appreciated that the spring torsion force tends to rotate the collector shoe supporting arm 21 in a clockwise sense as related to FIGURE 1 and thereby urges the collector shoe 22 away from the mounting base 20. As shown in phantom in FIGURE 1, the base latching tail 56 of the spring 25 may optionally be also disposed within either of the recesses 52 or 53 to increase the spring torsion and hence increase the spring biasing force operative upon the collector shoe 22 via its supporting arm 21. A predetermined minimum spring torsion and a limitation on the maximum displaced position of the collector shoe 22 away from the mounting base 20 are provided by means of an arm stop 43 formed as an integral projection of the hub 29 which partially overlies the collector shoe supporting arm 21 at the lower end thereof where it turns laterally into continuation with the lower leg 46.

Having now described my invention in connection with a particularly illustrated embodiment thereof, it will be realized that variations and modifications thereof may now occur to those persons normally skilled in the art without departing from the essential spirit or scope of my invention, and accordingly, it is intended to claim the same broadly as well as specifically as indicated by the appended claims.

What is claimed as new and useful is:

1. In a current collector device for transferring electrical current from a conductor rail system to an electrically energizable work utility, the combination comprising, a mounting base adapted for physical securement to the work utility for travelling motion therewith, an arm pivotally coupled at its lower end to to said mounting base and including means at the upper end for coupling said arm to a current collector shoe, and torsion spring arm biasing means coupled to said arm and said base and exerting a rotational spring force upon said arm effective to bias the upper end thereof away from said base, said base including a hub formation having a circular cross-section bore therethrough, said arm having a circular cross-section lower leg turned laterally from the major lengthwise extent of the arm and close fittingly rotatably secured within said hub bore, and said torsion spring comprising a plurality of coils disposed freely around said base hub and having means for latching opposite ends thereof to said base and arm respectively.

2. The combination according to claim 1 wherein said mounting base further includes a plurality of spring latching retainers, and said spring is provided with a latching element engaged with one of said latching retainers to provide a predetermined spring torsion as determined by which one of said plurality of latching retainers is engaged by said latching element.

3. In a current collector device for transferring electrical current from a conductor rail system to an electrically energizable work utility, the combination comprising, a mounting base adapted for physical securement to the work utility for travelling motion therewith and including a hub formation having a circular cross-section bore therethrough, an arm for supporting a collector shoe, said arm having a circular cross-section lower leg close fittingly rotatably secured within said hub bore, helical coil torsion spring means coupled to said arm proximate said lower leg and coupled to said base effective to bias said arm for rotation about said arm lower leg as an axis, said mounting base further including a plurality of spaced parallel finger projections defining therebetween and with the body of the mounting base a plurality of separated recesses, and one end coil of said torsion spring being turned laterally out from the spring helical axis and provided with a latching tail selectively disposable within a chosen one of said mounting base recesses to selectively torsion the spring.

4. A current collector device for transferring electrical current from a conductor rail system to an electrically energizable work utility, comprising in combination, a mounting base adapted for physical securement to the work utility for travelling motion therewith and including a hub formation having a circular cross-section bore therethrough, a current collector shoe carrying a contact block adapted for sliding surface contact with a rail of the conductor rail system from which the work utility is energizable, a generally C-shaped collector shoe supporting arm having an upper leg pivotally coupled to said collector shoe and a circular cross-section lower leg close fittingly rotatably secured within said hub bore, helical coil torsion spring means coupled to said arm proximate said lower leg and coupled to said base effective to bias said arm for rotation about said arm lower leg as an axis, and stop means projecting from said base in overlying relationship to a portion of said arm effective to prevent more than a predetermined rotation of said arm, said mounting base further including a plurality of spaced parallel finger projections defining therebetween and with the body of the mounting base a plurality of separated recesses, and one end coil of said torsion spring being turned laterally out from the spring helical axis and provided with a latching tail selectively disposable within a chosen one of said mounting base recesses to selectively torsion the spring, the other end coil of said torsion spring being also turned laterally out from the spring helical axis and provided with a terminating hook engaged with said arm as aforesaid.

5. In a current collector device for transferring electrical current from a conductor rail system to an electrically energizable work utility, the combination comprising, a mounting base adapted for physical securement to the work utility for travelling motion therewith and including a hub formation having a circular cross-section bore therethrough, an arm for supporting a collector shoe, said arm having a circular cross-section lower leg close fittingly rotatably secured within said hub bore, helical coil torsion spring means disposed around said base hub and coupled to said arm proximate said lower leg and coupled to said base effective to bias said arm for rotation about said arm lower leg as an axis, said mounting base further including a plurality of spaced parallel finger projections defining therebetween and with the body of the mounting base a plurality of separated recesses, and one end coil of said torsion spring being turned laterally out from the spring helical axis and provided with a latching tail selectively disposable within a chosen one of said mounting base recesses to selectively torsion the spring, the other end coil of said torsion spring being also turned laterally out from the spring helical axis and provided with a terminating hook engaged with said arm as aforesaid.

References Cited in the file of this patent

UNITED STATES PATENTS

| | | |
|---|---|---|
| 488,022 | Mason | Dec. 13, 1892 |
| 496,631 | Adams | May 2, 1893 |
| 680,437 | Parker | Aug. 13, 1901 |